United States Patent
Christensen

Patent Number: 5,358,306
Date of Patent: Oct. 25, 1994

[54] CONVERTIBLE CHAIR INSTALLATION FOR OR IN VEHICLES

[75] Inventor: Ole V. Christensen, Skødstrup, Denmark

[73] Assignee: V. Brøndum A/S, Silkeborg, Denmark

[21] Appl. No.: 890,250

[22] Filed: May 29, 1992

[30] Foreign Application Priority Data

May 29, 1991 [DK] Denmark ............... 1024/91

[51] Int. Cl.$^5$ ............................................. A47C 13/00
[52] U.S. Cl. ................................ 297/62; 5/9.1; 297/111
[58] Field of Search ............. 297/62, 63, 105, 111, 297/124, 234, 243; 5/9.1, 8

[56] References Cited

U.S. PATENT DOCUMENTS

| | | |
|---|---|---|
| 544,510 | 8/1895 | Krehbiel ............... 297/62 |
| 2,229,608 | 1/1941 | Ragsdale et al. ........ 297/62 |
| 2,966,199 | 12/1960 | Waerner ............... 297/62 |
| 3,027,571 | 4/1962 | Bendixen et al. ........ 5/9.1 X |
| 4,440,439 | 4/1984 | Szabo ................. 297/62 |
| 4,922,561 | 5/1990 | Williams .............. 297/62 |

FOREIGN PATENT DOCUMENTS

| | | | |
|---|---|---|---|
| 991729 | 10/1951 | France | 297/62 |
| 1450283 | 7/1966 | France | 297/62 |

*Primary Examiner*—Laurie K. Cranmer
*Attorney, Agent, or Firm*—Antonelli, Terry, Stout & Kraus

[57] ABSTRACT

In the so-called 'ski-coaches' special chairs are used, the back rests of which can be swung up to form an upper row of bed elements, while the seat portions are completed with filling-in-elements so as to form a lower row of bed elements. Mostly, particularly the back rests are of such a special design that in fact the chairs are unusable as normal coach chairs during the entire period outside the ski-ing season, and it is customary, therefore, to change out the entire seat installation before and after this season. According to the invention the chairs (4) are adapted such that they will be universally usable, i.e. by way of a conventional front side profilation and by an upper carrier element (12) mounted inside the back rest, whereby the rear side of the back rest will exhibit no visual sleeping fitting. The carrier element (12) is located spaced underneath the top end of the back rest, whereby the sides of the uppermost portion of the back rest may be designed in an attractive, upwardly converging manner.

11 Claims, 2 Drawing Sheets

CONVERTIBLE CHAIR INSTALLATION FOR OR IN VEHICLES

TECHNICAL FIELD

The present invention relates to a seat installation for transportation vehicles of the type, in which a row of seats in a combined sitting and laying position can be converted into a row of bed elements in two levels, viz. by swinging up the back rests of the chairs for forming bed elements in an upper level and mounting filling in elements between the chair seats for forming a row of beds in the lower level. It is possible hereby to convert each set of two chairs into an upper and a lower bed, such that it is possible to provide just as many bed units as there are chairs.

BACKGROUND ART

Installations of this type are known particularly from such busses, called 'ski-busses' which are long-distance busses, for the operation of which it is necessary that they can drive both day and night and that the travellers can spend the night reasonably comfortably for effective sleep, that is on real, horizontal bed units.

These chairs should be correspondingly particularly designed, partly with strong, upright supports for carrying the upper bed row and partly with extra cushion elements for filling in the spaces between the seats in the lower bed row. The chairs are mounted in pairs, side by side, and the upstanding supports may thus be formed by a single carrier for each pair of chairs. The carrier member should project so far upwardly that an upper, horizontal part thereof can carry the associated, swung-up back rests, and typically this height will be underneath the top edge of the back rest of an ordinary train or bus chair. For this reason it is natural that the upper carrier member be used not only as a carrier member, but also as a shaft for the swinging up of the back rest, the upper, horizontal carrier portion hereby being connected with the rear side of the back rest in a manner such that the back rest is fixed to and supported by the upper carrier portion in both the sitting and the lying position.

It will facilitate the conversion of the chair that the back rest can thus simply be swung about the fixed carrier portion for making the conversion, and it is an accepted associated drawback that each pair of chairs, when seen from behind, appears with a heavily dimensioned cross rod across an upper part of the back rest, this being unusual for ordinary chairs.

Given that the back rests should play a very important roll as bed elements it has been customary to design the back rests almost primarily as bed elements, i.e. with flat front sides that will form flat couches in the swung-up position. Hereby, of course, the back rests will be perfect as bed elements, but in return they are rather unsuitable as back rests in chairs, inasfar as in this area it is normal to have a special ergonomical design of the back rest and moreover to design the back rest with a look more elegant than only an upstanding, rectangular plate block that is functionally well suited to form part of an upper, continuous row of beds.

To the paying customers all this will be acceptable in situations in which it is of main importance that the transportation can take place as a long tour e.g. to and from a skiing site, but just this typical example will show that the relevant activities may well be largely season conditioned, while outside these relative short periods, concerning the application of the transportation, it will be unrealistic to offer to the passengers vehicle a correspondingly low seating comfort and an associated clumsy look of the back rests. This is a reality to the degree that it is a quite common practice that the bus owners every year, at the beginning and the end of the skiing season, carry out a total change of the entire chair installation of the vehicle, such that outside the particular season it is possible to drive with more usual, nice-looking and more user friendly chairs for servicing non-sleeping passengers. These changes, however, are rather costly.

DISCLOSURE OF THE INVENTION

It is the purpose of the present invention to provide a chair installation, which is universally applicable for both summer and winter operation, such that the said costly changing of the seats can be entirely avoided, and such that even during the special winter operation it is possible to maintain a nice-looking and user friendly design of the back rests in addition to being perfectly usable as reclining coach elements for sleeping purposes.

The invention is based on the consideration that an ergonomically correct profile of a back resting element will not be subjected to the same forces as will occur when the same element is loaded by a reclining person, when assuming a swung-up, horizontal position. In other words, a back rest for a sitting person may well, in the height direction thereof, present bulgings and depressions, which will provide a perfect support for the back of the sitting person, while the same bulgings, when based on the use of a suitably resilient material, will be uncomfortable when the person is lying on the same element. It is practically possible to design the convertible chairs with back rests that will be generally acceptable for all-year operation, primarily with only sitting passengers. It is not that the reclining comfort on the correctly designed back rests is better than on the discussed flat elements, but under this circumstance the lying comfort is not subject to the highest expectations anyway, and the advantage with respect to the universal applicability of the installation will be much more valuable in practice.

Another important circumstance is that the carrier portion, which, by the way, may be separated at the middle thereof for enabling an individual inclination adjustment of the two neighboring back rests, is known to appear as a heavily dimensioned cross element at the upper end of the rear side of the back rest, which, together with the associated pivotal mounting of the back rest, contributes substantially to an unattractive look of the chair. This design is logical enough, since of course it is desirable to hold the thickness of the flat 'coach back rest' as small as possible, i.e. with the use of a carrying rear plate having on its front side a coach element of just the required minimum thickness; when the carrier member is then mounted at the rear side of the plate a safe carrying without any narrowing of the effective coach thickness will then be achieved.

In connection with the invention, however, it is recognized that it is very well possible to place the carrier member at the front side of the carrier plate, that is within the effective thickness area of the coach, without this having to cause disadvantageous consequences for the lying comfort. This is possible particularly when use is made of the profile of the front side of the back rest, as it is hereby essential that a slim look of the back rest is achieved when only a single transverse area appears as being thin, typically the area adjacent the neck of the sitting person, while from this area there may occur thickenings both upwardly, e.g. in the form of backhead supports, and downwardly, in the form of a loin support, which may even at the sides be extra thickened for forming side supporting portions, without the back rest thereby generally appearing visually thick, contrary to a corresponding, thick plate-like element.

In spite of the thin look of the back rest there will thus nevertheless appear thickenings, behind which it will be possible, without any inconvenience, to provide a carrier rod, e.g. in the back head thickening, but preferably the invention provides for a quite opposite approach, viz. that the carrier rod may well be placed adjacent a coach area having reduced thickness, such as in the back head depression, when thickenings are present at both sides thereof, i.e. both above and below thereof, because the resting pressure against the depression will then be noticeably reduced because of the neighboring outbulgings, i.e. the carrier rod will not be perceived in any negative manner despite its being placed near the outer side of the coach.

As a result of all this the back rest can be designed with a completely smooth rear side, because the carrier rod can be mounted projecting inwardly from the outer edge of the back rest, and hereby the back rest may appear as an almost conventionally designed bus chair, only having at its visible side edge an upstanding post for the carrier rod, which, at an upper area, disappears into the side face of the back rest. The post, however, is justified by the chair being designed with adjustable back rest inclination, such that this facility makes the post visually acceptable also for an 'all season chair'.

In previously known designs the carrier rod has been located adjacent the top edge of the back rest, and it has been possible to swing up the back rest into a horizontal position, in which the swung up lower edge of the back will Just reach the carrier rod of the preceding chair, whereby it has been natural that the lower edge is brought into a locking engagement with the respective preceding carrier rod by actuation of suitable locking means between these parts. The invention, in a decisive manner, breaks with this concept in that the carrier post does not extend all the way up to the top edge of the back, but e.g. only up to the said neck area, whereby a swinging up of the back will be connected with a rearward downswinging of the back portion which projects further up from the transverse carrier rod. Consequently the adjacent swung-up back cannot be supported by being coupled to the respective carrier rod, because its lower, swung-up end should be supported in a position, in which this end is located next to the swung-down upper end of the back of the preceding chair, i.e. spaced from the carrier rod. A coupling together at this place could be established, but it is realized that it will be simpler to entirely avoid such a coupling, this being achievable by each chair being provided with means for supporting both the front and the rear portion of the swung-up back in a manner such that the backs of the single chairs, when swung up, will automatically and in a self carrying manner be flush with the swung up backs of the preceding and the following chairs, whereby a real coupling between these elements will be fully superfluous.

This implies not only that a conventional, separate coupling operation can be avoided, but also that the transverse carrier rod can be located in a level beneath the top edge of the back, whereby the carrier post shall not extend to the very top of the back, this again conditioning a weakened visual dominance of the carrier post. Moreover, it is made possible that the part of the back which, in the sitting position thereof, projects upwardly past the transverse carrier rod may be designed in a upwardly converging manner, which will contribute to a desired 'light' look of the chair, without this having any significant importance for the lying comfort on the swung-up backs. For the all season applicability of the chairs it is highly important that these upper back portions can be terminated in an elegantly converging manner, and in connection this will be possible without any associated noticeable drawbacks.

BRIEF DESCRIPTION OF THE DRAWINGS

In the following the invention is described in more detail with reference to the drawing, in which.

BEST MODE FOR CARRYING OUT THE INVENTION

Figure 1:
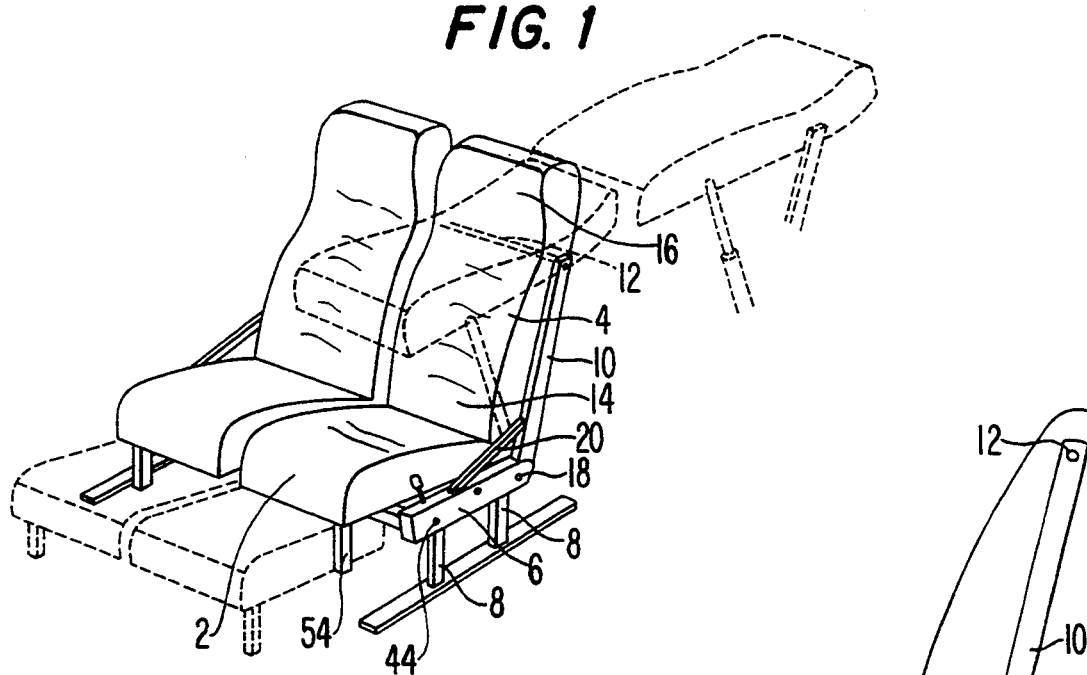
FIG. 1 is a perspective view of a pair of neighboring bus chairs according to the invention.

A chair as shown in FIG. 1 consists of a seat element 2 and a back 4, the seat being supported on a frame carried by side pieces 6 that are floor supported by means of legs 8. The back 4 is supported rearwardly by means of a rear post 10 upstanding from the the rear edge of the frame 6 and having at its upper end a transverse carrier rod 12, which projects horizontally inwardly through an upper area of the back in a depressed portion thereof between a relatively wide, lower loin support 14 and an upper, forwardly thickened back head rest portion 16.

Figure 2:
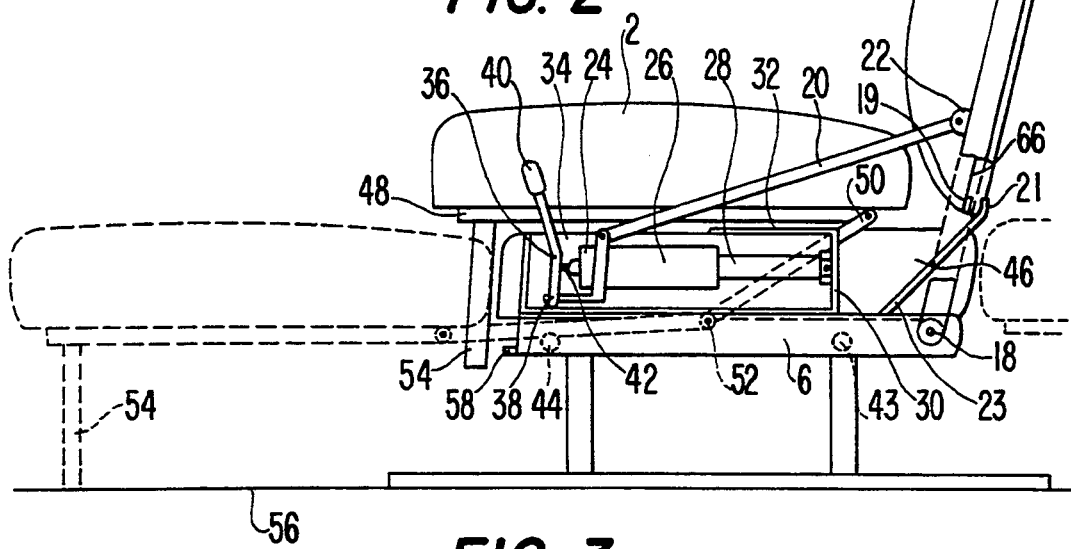
FIG. 2 is a side view thereof.

The upright side post 10 may be adjusted to different rearward inclinations about a lower pivot point 18 by means of a rod connection 20, FIGS. 1 and 2. This rod connects a pivot 22 on the post 10, located relatively close to the pivot 18, with a front end portion 24 of a horizontally disposed gas spring 26, which has a rearwardly projecting piston rod 28 secured to a fixed rear wall 30 of an outer cover housing 32 for the spring cylinder 26. In the top side of the housing 32 is provided a slot 34, through which an upstanding actuation lever 36 projects, this lever at its lower end being connected with a pivot 38 in rigid association with the cylinder 26, while at its upper end it has a handle 40. When the handle 40 is pressed rearwardly the lever 36 is forced against a valve actuator 42 on the cylinder 26 in a manner such that the entire cylinder 26 will be displaced rearwardly, that is bringing along the handle 40, and the associated rearward tilting of the back frame 10 may be stopped by releasing the handle 40 or by the frame 10 or the cylinder 26 meeting a suitable stop.

Figure 5:
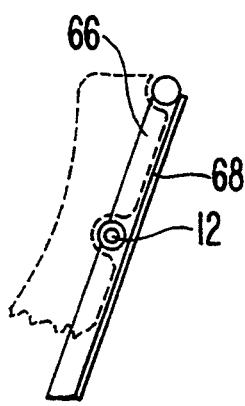
FIGS. 5 and 6 are side views of a frame of the back rest.
Figure 6:
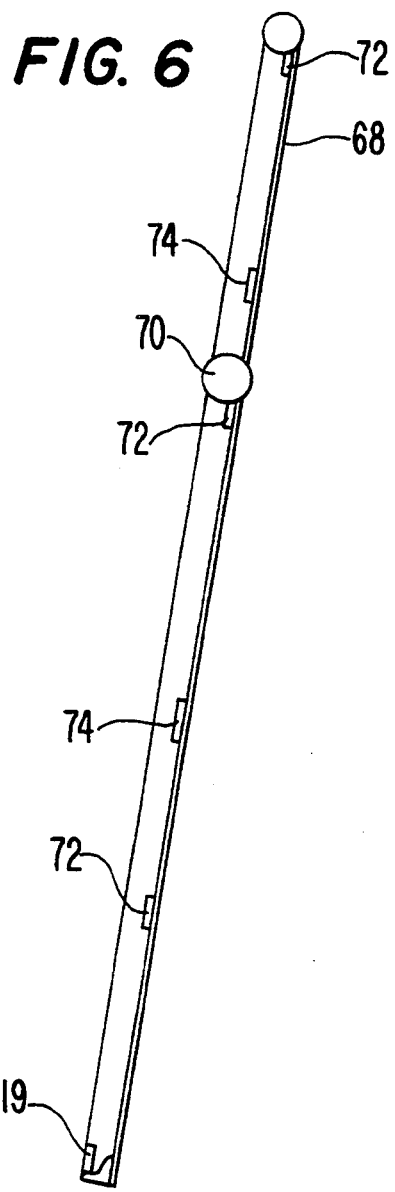

The back has a frame 66, see also FIGS. 5 and 6, at the lower sides of which there are provided projecting abutments 19. Just behind these there is located a free end portion 21 of an arm 23 rigidly upstanding from the lower chassis, whereby the lowered end of the back cannot be displaced rearwardly. This means that when the back is tilted rearwardly there will be no unpleasant mutual displacement between the seat 2 and the lower edge area of the back.

This design, according to which the handle 40 follows the horizontal movement of the cylinder 26, is noticeably simpler than the conventional design, where the handle 40 is pivoted in a stationary manner, and additionally the actuation operation will be more suitable in view of the fact that the user's arm and hand as used for the actuation will also be rearwardly displaced.

In a low level on the lower chassis 6, 8 there is mounted a rearmost, transverse rod 43 centrally with or in front of the pivots 18, and a foremost transverse rod 44, which rods 43, 44 carry a fixed couch part 46, above which the seat element 2 is located. This element 2 has a lower carrier frame 48, which at its rear end is pivotally connected with a set of pivot arms 50 extending forwardly and downwardly to a pivot point 52 on the chassis portion 6. At its front end the frame 48 has a pair of depending support legs 54, which do not reach the floor, designated 56, and besides, this frame is supported against fixed supports 58 of the sub chassis adjacent its foremost side portions; the illustrated support 58 cooperates with a non-illustrated, rearwardly projecting protrusion on the support leg 54.

Thus, the seat element 2 will be forwardly displaceable by the arms 50 pivoting about the lower pivots 52, into an advanced and lowered position as shown in dotted lines in FIG. 2, in which the legs 54 are supported against the floor 56, while the rear end of the seat element is supported by the arms 50 abutting the transverse rod 44, all in a manner such that the top side of the advanced seat element 2 will be horizontally flush with the top side of the fixed, low couch 46 in a position immediately in front thereof.

Figure 3:
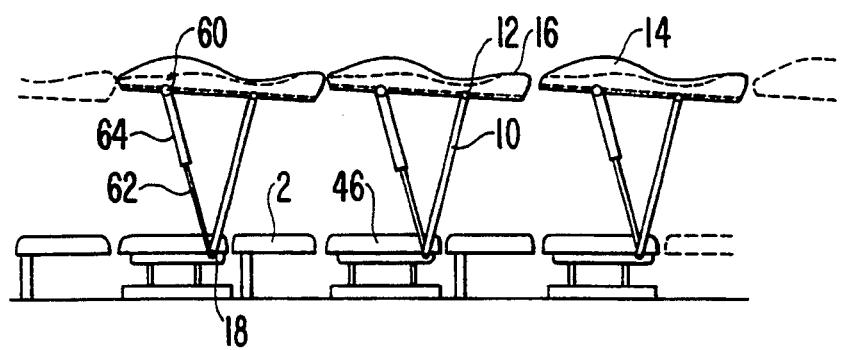
FIG. 3 is a corresponding side view of a row of chairs shown in a converted condition.

The chairs are mounted with such a mutual spacing that the advanced seat element 2 will extend forwardly just to the rear end of the fixed couch member 46 of the preceding chair, such that as shown in FIG. 3 there will be provided a coherent row of seat members 2 and 46 usable as sleeping couches.

The backs 4 may be swung up about the transverse rods 12 into upper bed positions as shown in FIG. 3 and indicated in dotted lines in FIG. 1. It is hereby presupposed that the back frames 10, 12 have been raised to a standard position with a uniform height location of the pivot points 22. For additional support of the backs in their swung-up positions there is at each chair provided a telescopic system 62, 64, FIG. 3, which at its upper end is connected with a pivot 60 at the side of the back frame, while at its lower end it is pivotally connected with the sub chassis 6, in the pivots 18 or separate pivots close thereto. When the parts 62 and 64 are pushed completely together, the compressed parts extend along the arms 10 and are hidden when viewed as in FIG. 2.

Each of these telescopic systems have individual means for being temporarily locked such that each system can be fixed in just that position in which the back rest element 4 will be supported in a lying position flush with the other back elements, as shown in FIG. 3, such that also these elements will form a longitudinal, coherent lying surface. The required locking may be effected in a simple manner by the use of a laterally spring biased ball on the telescopic rod 64 which is brought into engagement with a hole in the surrounding telescopic tube 62 in such a manner that it is reasonably easy, but not unintentionally, to release the holding engagement by pressing in the ball to ensure that thereafter the back can be swung down into its normal position.

The overall design is such that the swung-up backs 4 will reach together while also the seat portions 2 and 46 will reach together. There is no need for a direct coupling together or locking of the swung-up backs, because they will be safely supported anyway.

The swung-up backs may be stabilized otherwise than with the use of rod elements 62, 64, e.g. by means of a ceiling mounted suspension system or a rigid fastening to the posts 10. The rod elements 62, 64 could be cured, at their lower end, to fixed portions other than the same chair chassis to which the associated back belongs.

It should be noted that the bulgings 16 of the swung-up backs will not in practice be as large as shown in FIG. 3, because what is really bulging out is the side areas of the backs, i.e. the lying surface at the middle area is more flat when seen in the longitudinal direction of the bed row. On the other hand, the back head rests 16 are clearly bulging up, but as mentioned without in any way making the sleeping surfaces unacceptable.

The fact that the swung-up backs will be self carried by each single chair and thus will require no coupling to the carrier system 10, 12 of an adjacent chair implies that the backs 4 can be swung about an axis 12, which in the seating position will be located spaced beneath the upper end of the back, i.e. the back may have a desirable large height without the side posts 10 projecting correspondingly high. This will contribute to the chair as a whole being designable with an acceptable look. It is a further effect that the couch height above the floor 56 will be relatively low, this being advantageous in any vehicle. This circumstance could give rise to problems with respect to the free height between the lower and the upper couch system, if the lower system was located in the level of the seat elements 2, but it will be appreciated that this level has been lowered in the sleeping positions of these elements, where the level is given by the top of the fixed couches 46, such that the seat level is not hindering for the swung-up backs to be located in the desired low level.

Figure 4:
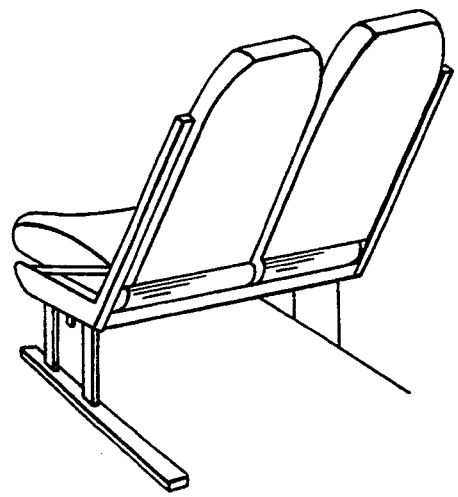
FIG. 4 is a perspective view of a pair of chairs according to the invention, seen from behind.

It will be seen from FIG. 4 that the rear sides of the backs can appear as fully smooth faces with a quite ordinary look, without this being disturbed by the relatively heavy carrier rods 12 as stretching along the rear side thereof and inside the back. The upholstering of the back should not need to be particularly thickened for the internal mounting of the carrier rod 12 to be acceptable. As indicated in FIG. 5 it is a possibility that the back is designed with an outer rear tube frame 66, to the rear side of which there is secured by spot welding a rear metal plate 68 that forms a basis for the frontlying upholstering, while the carrier rod 12 or rather a receiving tube 70 therefor is projecting inwardly in plane with the frame 66 and is secured by welding to this frame and to the rear plate 68.

Just when the back appears with outbulgings that will ensure a good sitting comfort the minimum thickness of the front side upholstering will be relatively small, and hereby the total back thickness may be kept so small that the chair as a whole may appear with a look that is almost quite normal for ordinary bus chairs.

In FIG. 6 is shown a preferred design of the back frame. There is still used a pipe frame 66, but the rear plate 68 is a plywood plate which is secured to ears 72 welded to the frame tube. The plate 68 is also by riveting secured to a pair of transverse fish plates 74, which, in addition to having a supporting effect, can also be used as a mounting base for desired parts on the rear side of the back, e.g. an upper handle and optionally lower table plate mountings.

I claim:

1. A convertible seat installation of the type where a row of chairs in a combined sitting and sleeping vehicle are convertible from seats in a sitting position to beds in upper and lower rows by upward pivoting of a backrest of each of the chairs to form the upper row of beds and by placing fill-in-elements between chair seats to form the lower row of beds with a front side of the backrest of each of the chairs in a row in a sitting position facing in an identical orientation wherein:

said backrest is pivotable about an upper, transverse carrier rod to an upward position when said backrest is converted from the sitting position to the upper row of beds with the carrier rod projecting from an upper end of an angularly adjustable carrier post which is adjusted to vary an angular inclination of the backrest and which is spaced outside of the backrest with a lower end of the carrier post being joined to a lower part of the seat installation;

the backrest when pivoted about the upper, transverse rod to the upward position about said carrier rod is stabilized by the carrier post and the front side has headrest and loin support portions; and the transverse carrier rod in the sitting position is underneath a top end of the backrest.

2. An installation according to claim 1 wherein:
the transverse carrier rod is located behind a depressed front side area of the backrest at a lower end of the headrest portion.

3. An installation according to claim 2 wherein:
lateral surfaces of the backrest extend upwardly converging above the transverse carrier rod.

4. An installation according to claim 3 comprising:
means for supporting the swung-up backrests at an area adjacent swung-up lower edges.

5. An installation according to claim 4 wherein the means for supporting comprises:
a pair of stow-away rod connections disposed between a chair chassis and the swung-up lower edges of the backrest.

6. An installation according to claim 5 wherein:
the pair of rod connections are a telescopic rod system permanently mounted between a chair chassis and a lower portion of the backrest.

7. An installation according to claim 6 wherein:
the telescopic rod system is mounted between the lower portion of the backrest and the chair chassis associated with the chair having the backrest to which the telescopic rod system is attached.

8. An installation according to claim 1 further comprising:
a side handle coupled to an actuator and an inclination mechanism of the backrest with the handle and actuator moving in association with the backrest being tilted forwardly or rearwardly.

9. An installation according to claim 1 wherein:
the pivotable backrest in the sitting position is tiltably connected with the carrier post while a lower end of the backrest is horizontally supported by abutting a stationary abutment in front of and behind the lower end of the backrest.

10. An installation according to claim 1 wherein:
the installation is forwardly displaceable into the beds of the lower row with a stationary couch element mounted underneath the seat.

11. An installation according to claim 1 wherein:
the transverse carrier rod is mounted inside the backrest in front of a rear covering extending smoothly across a mounting place of the transverse carrier rod.

* * * * *